(12) United States Patent
Xiao et al.

(10) Patent No.: US 8,862,103 B2
(45) Date of Patent: Oct. 14, 2014

(54) DYNAMIC NAVIGATIONAL SYSTEM

(75) Inventors: Hong Xiao, Acton, MA (US); Dongchen Wang, Concord, MA (US); Robin Chu Hsin Chang, Los Altos, CA (US); Andre Turner, Belmont, MA (US); Azim Nasir, Foxboro, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/251,462

(22) Filed: Oct. 3, 2011

(65) Prior Publication Data

US 2013/0084833 A1    Apr. 4, 2013

(51) Int. Cl.
*H04M 3/42*    (2006.01)
*H04W 4/18*    (2009.01)

(52) U.S. Cl.
CPC .......... *H04W 4/185* (2013.01); *H04M 2242/28* (2013.01); *H04M 2250/10* (2013.01); *H04M 2242/30* (2013.01)
USPC ................... 455/414.1; 455/404.2; 455/414.3

(58) Field of Classification Search
USPC ...................................... 455/414.1
See application file for complete search history.

(56) References Cited

U.S. PATENT DOCUMENTS

| | | | | |
|---|---|---|---|---|
| 8,065,171 | B2 * | 11/2011 | Nguyen et al. | 705/5 |
| 2008/0133282 | A1 * | 6/2008 | Landar et al. | 705/5 |
| 2008/0176545 | A1 * | 7/2008 | Dicke et al. | 455/418 |
| 2009/0036148 | A1 * | 2/2009 | Yach | 455/457 |
| 2009/0132665 | A1 * | 5/2009 | Thomsen et al. | 709/206 |
| 2009/0234659 | A1 * | 9/2009 | Liao et al. | 705/1 |
| 2009/0276318 | A1 * | 11/2009 | Broadbent et al. | 705/14.64 |
| 2009/0300113 | A1 * | 12/2009 | Conmy et al. | 709/204 |
| 2010/0007525 | A1 * | 1/2010 | Shanbhag et al. | 340/932.2 |
| 2010/0088372 | A1 * | 4/2010 | Shridhar et al. | 709/204 |
| 2010/0274855 | A1 * | 10/2010 | Wassingbo | 709/206 |
| 2011/0066468 | A1 * | 3/2011 | Huang et al. | 705/9 |

* cited by examiner

*Primary Examiner* — Charles N. Appiah
*Assistant Examiner* — Mazda Sabouri (57) ABSTRACT

A system and method for a dynamic navigational system may include a server configured to send event information associated with an event to a user device. The event information may include a general event location. The server may also be configured to receive a user response to the event information and send a focused event location to the user device in response to the user response selecting to attend the event. The focused event location may be located within the general event location.

16 Claims, 9 Drawing Sheets

FIG. 1

Create Event

Event:
Venue Name:
Address:
Geo Location:
Date:
Start Time:
End Time:
Hosted By:
Attendance:
Host Comments:
Invitees:

Save    Add Invitee    Cancel

*FIG. 2*

Search Event

Institute Name:
City, State, Zip Code:
Event Name:
Street Address:
Date:
Time:

Search    Cancel

DYNAMIC NAVIGATIONAL SYSTEM

BACKGROUND

Traditional global positioning satellite ("GPS") devices may use GPS technology to display maps and direct users to a specific street address via turn-by-turn directions. Using the street address to supply directions can often be misleading for users, especially if the location is within a large area or building such as a park, airport, or stadium. A user may wish to be directed to a more specific destination point, such as a specific gate, entrance, etc. Thus, there is a need for more accurate navigational technology.

DETAILED DESCRIPTION

An exemplary navigational system may include a host device connected to a server via a host network. The host device may facilitate the creation of events with each event specifying at least one general event location. A user device may be connected to the server via a user network and may be configured to view the events created by the host device. The server may include a database for saving the events as well as recording user responses to each event. The host may supply the user with a focused event location setting forth a more specific or sub-location within the general event location. A global positioning satellite ("GPS") system included in the user device may use the focused event location to provide driving directions to the user via the user device. The focused event location may be a geographical location, hereinafter referred to as a geo location, such as longitudinal and latitudinal coordinates. The focused event location may differ from the physical address of the event wherein the focused event location may be a more precise and exact location, thus enabling the GPS system included in the user device to direct the user to the exact location of the event. For example, the focused event location may be the longitudinal and latitudinal coordinates of a specific location of a park. Because a park may cover several square miles, the street address alone may be a misleading end point when used by the GPS system to provide directions to the user. The geo location may provide a precise location, thus enabling the GPS system to provide accurate directions to the focused event location. In addition to the longitudinal and latitudinal coordinates, the geo location may also include a specific elevation, which may be the geometric height of the focused event location as it relates to sea level.

Figure 1:
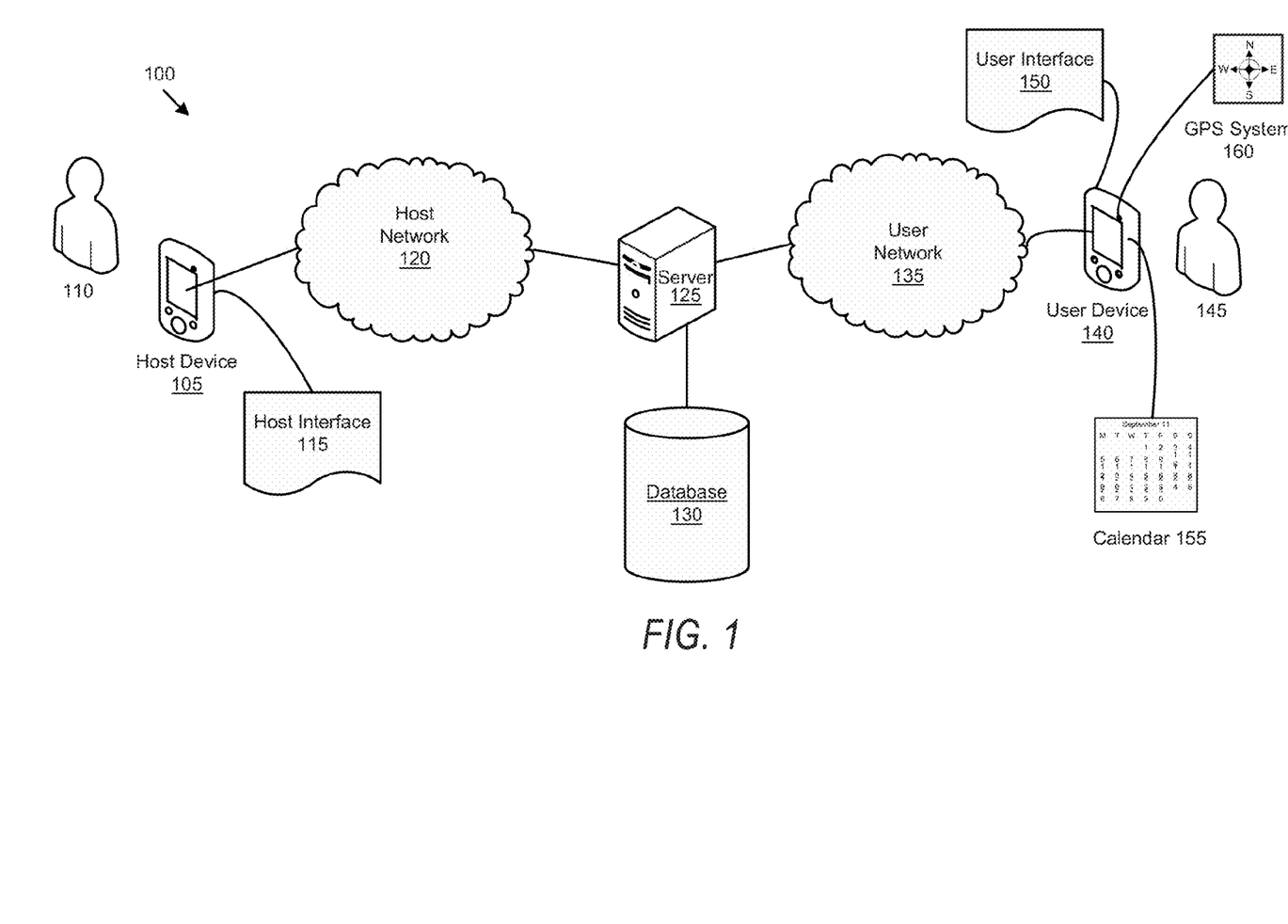
FIG. 1 illustrates an exemplary navigational system.

As illustrated in FIG. 1, an illustrative navigational system 100 generally includes one or more host devices 105 corresponding to a respective host 110. The host device 105 may be a single computing device, or one of multiple computing devices, having a processor for executing computer-executable instructions, and a memory and/or other computer readable media for storing data and computer-executable instructions. For example, client device 105 may be a smart phone, personal digital assistant, laptop computer, desktop computer, tablet computer, GPS console, etc.

The host 110 may be the originator and creator of an event. The host 110 may be an individual or group responsible for organizing the event. For example, the host of a school function may be the principal or teacher responsible for the event. The host 110 may decide when and where the event will occur, as well as who is to be invited to the event. An event may be any occasion, activity or gathering such as a sporting event, company picnic, birthday party, among others. The event may also be any number of meetings, expositions, festivals, sporting tournaments, political rallies, school functions, standardized exams, etc.

Figure 2:
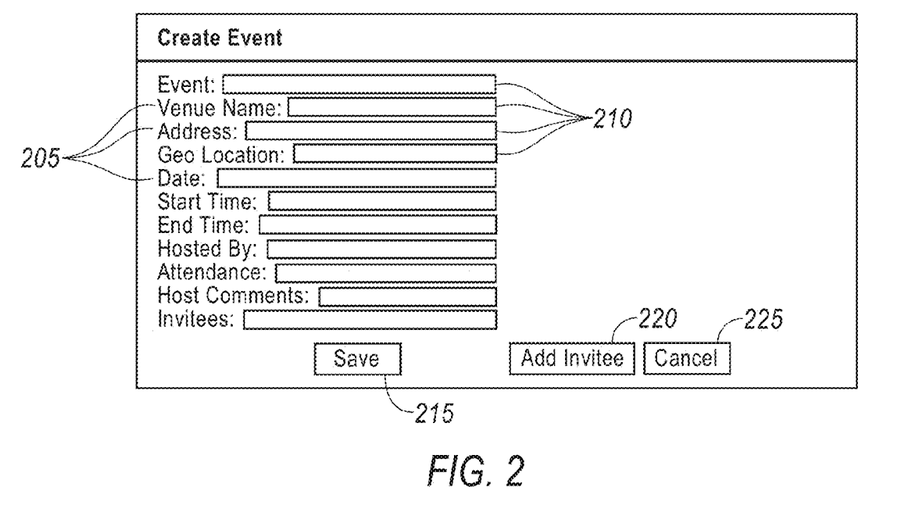
FIG. 2 illustrates an exemplary interface for creating an event.

A host interface 115 may facilitate creation of and changes to an event via the internet or 3G/4G data network using the host device 105. For example, data networks such as, High-Speed Downlink Packet Access (HSDPA), Universal Mobile Telecommunications System (UMTS), HSPA (High-Speed Packet Access), WiMax and Long Term Evolution (LTE) may be used to facilitate communication between the host device 105 and server 125. The host interface 115 may be displayed on the host device 105. An exemplary interface 115 for creating an event is shown in FIG. 2 and described in more detail below. Additionally or alternatively, the host 110 may create events via social networking applications such as LinkedIn® and Facebook®.

The event may be a private event or a public event. Private events may require the host 110 and a user 145 to be part of a specific group, such as a Facebook® group, email list, etc. By being part of this group, the user 145 may be automatically invited to events created by the host 110. To prevent uninvited users from attending an event, the invited users may be required to be authorized via their own accounts (e.g., Facebook®, Twitter®, and LinkedIn®) to view an event invite. The host 110 may also decide to make the event a public event, for which invitees are not necessary. In this case, users 140 may search a database 130 via a server 125 to find and select a particular public event. The host 110 may send an event invite to the server 125. In general, but not necessarily, a public event may include invitees, whereas a public event may not. Some events may be created so that both invited and uninvited users may attend. For example, certain users 145 may be invited to attend a volleyball tournament because they have played in the tournament in the past. Concurrently, other uninvited users 145 may search for the volleyball tournament and subsequently sign up to attend.

The host network 120 may facilitate communication between the host device 105 and server 125. The host network 120 may be a packet network such as an internet protocol (IP) network. As such, in the exemplary illustration host network 120 generally uses one or more known protocols for transporting data, such as user datagram protocol (UDP), transport control protocol (TCP), hypertext transfer protocol (HTTP), etc. Further, host network 120 may represent a plurality of different networks such as a wide area network (WAN), e.g., the Internet, a local area network (LAN), etc.

The server 125 may be one or more computing devices, each having a processor for executing computer-executable instructions, and a memory and/or other computer readable media for storing data and computer-executable instructions. Instructions included on server 125 generally include instructions for receiving data from the host device 105 such as event information generated using the host interface 115.

Database 130 generally includes data related to the events created by the host 110. The host 110 may create an event and save it in database 130 via server 125. Database 130 may also store multiple events for a user to search and select from. Database 130 may catalog the events based on any number of factors, including name, location, time, duration, etc. Database 130 may also maintain account information about the host 110. For example, a host 110 may be a retail establishment with consumers subscribing to their websites in order to perform online shopping, receive coupons and emails about the establishment, etc. The consumers' contact information may be saved in database 130 and used to send event invites if and when the establishment hosts an event. In one example, if an apparel manufacturer is releasing a new product and is hosting a party to launch the product, the subscribers may receive an invite merely by being registered with that apparel manufacturer.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language.

A user network 135 may facilitate communication between the server 125 and a user device 140. The user network 135 may be similar to the host network 120 in that it may be a packet network. As such, in the exemplary illustration, user network 135 generally uses one or more known protocols for transporting data, such as user datagram protocol (UDP), transport control protocol (TCP), hypertext transfer protocol (HTTP), etc. Further, user network 135 may represent a plurality of different networks such as a wide area network (WAN), e.g., the Internet, a local area network (LAN), etc.

The user device 140 may be a single computing device, or one of multiple computing devices, having a processor for executing computer-executable instructions, and a memory and/or other computer readable media for storing data and computer-executable instructions. For example, user device 140 may be a smart phone, personal digital assistant, laptop computer, desktop computer, tablet computer, GPS console, among others.

The user 145 may be associated with the user device 140. The user 145 may search, select, and register for a public event via a user interface 150. Additionally or alternatively, a user 145 may be invited to an event. As explained above, the user 145 may be required to be authenticated in order to view the event invite. The user 145 may then respond to the event by selecting to 'accept' or 'decline' the invite. When a user 145 responds to an event invite, the response is sent to the server 125 and saved in database 130. Thus, when a user 145 registers for an event, database 130 maintains this registration information. The database 130 may index each response and registration information within each event catalog. The index and catalog may be updated in real-time or near real-time. The server 125 may return this registration information back to the host device 105 so that the host device 105 may display, via the host interface 115, the registration information. For example, the host interface 115 may inform the host 110 of who is attending the event and supply an attendance head count to the host 110 for planning purposes.

Figure 3:
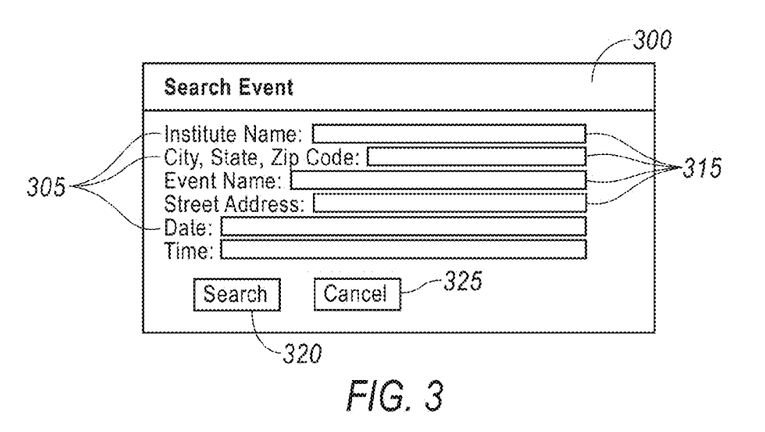
FIG. 3 illustrates an exemplary interface for searching for an event.
Figure 4:
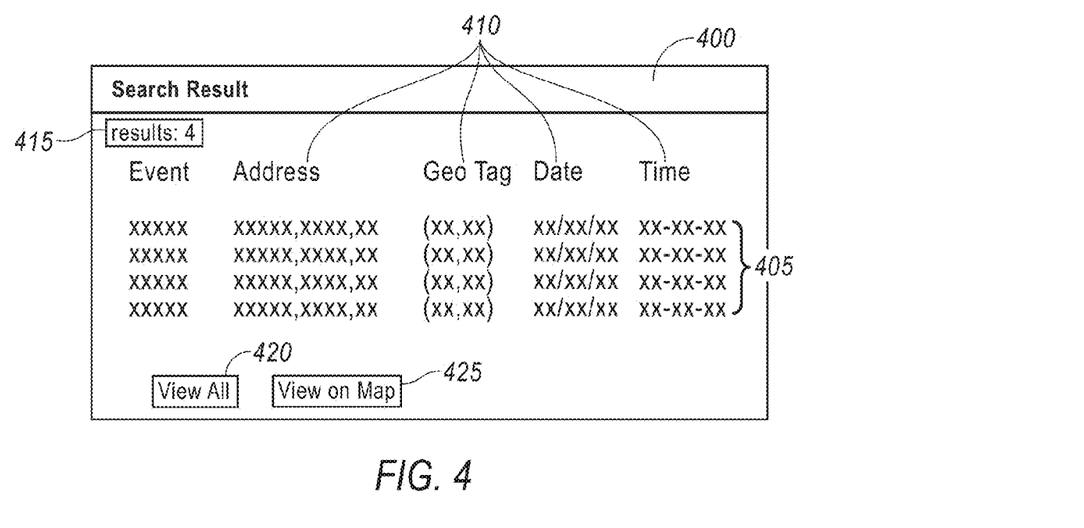
FIG. 4 illustrates an exemplary interface for displaying search results.

A user interface 150 within the user device 140 may facilitate viewing of and searching for events. An exemplary search interface for searching for an event is shown in FIG. 3 and an exemplary result interface is shown in FIG. 4.

A calendar 155 may be an application included on the user device 140. The calendar 155 may be dynamically updated as the user selects events to attend. Before the event is to commence, the calendar 155 may provide an alert to the user 145 via the user interface 150 reminding the user 145 of the event.

A GPS system 160 may also be included on the user device 140. The GPS system may be any type of navigation system on the user device 140. For example, the GPS system may be an internal application on the user device 140. It may also be a downloadable application such as Google Maps, Bing Maps, and so on. The GPS system may provide navigational directions via the user interface 150 based on the focused event location provided by the server 125. The GPS system 160 may integrate and receive data through the internet or 3G/4G data networks using the user device 140. The GPS system 160 may receive event information from server 125 in response to the user 145 selecting an event. For example, the server 125 may send location information to the GPS system 160 such as a geo location, or geographical coordinate, to the GPS system. The GPS system 160 may in turn provide at least one of a map and directions to the focused event location supplied by the server. The focused event location may be provided by the event information or additional information sent to the user device 145 separate from the event information. The focused event location may specify a sub-location within the general event location and may be an exact location within the venue or street address of the event. Additionally, the GPS system 160 may be configured to establish the current location of the user device via GPS technology, WiFi, Mobile Network Positioning technologies, etc.

Computing devices such as host device 105, user device 140, and server 125, etc. may employ any of a number of computer operating systems known to those skilled in the art, including, but by no means limited to, known versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as the foregoing generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other tangible medium from which a computer can read.

FIG. 2 illustrates an exemplary interface for creating an event. A create event block 200 may be displayed in the host interface 115. The create event block 200 may include event fields 205 and corresponding text blocks 210 in which the host 110 may enter the appropriate information. For example, host 110 may enter the event name in the "Event" text block. Then, other information relating to the event, such as the time, location, venue name, address, date, start time, end time, host name, attendance, and comments, may be entered in the remaining fields.

The host 110 may set forth the event location by entering one or both of the general event location and the focused event location, respectively represented in FIG. 2 as the street address and geo location. The geo location may be a sub-location within the general event location. At the time that the event is created, the exact geo location may be unknown and the host 110 may simply enter the street address or name of the venue. For example, if the host 110 is organizing a travel expo to be held at a large stadium, the host 110 may not know the exact location of the expo at the time the event is created. Thus, the host 110 may enter the general event location, e.g., the stadium name, in the "Venue Name" text block and leave the "Geo Location" block empty. As the date of the expo approaches, the host 110 may acquire more information about the venue and thus be able to determine the focused event location of the expo. The event may then be updated with the focused event location, e.g., the geo location, and saved in database 130.

As mentioned, the general and focused event locations may also be determined using GPS technology located on the host device 105. For example, the host device 105 may be capable of acquiring a location by simply being present at the physical location of the respective event. For example, if the host 110 is visiting the venue of an event, the host may select, via the host interface 115, to save his or her current location as the focused event location. The host device 105 may then indicated that the saved location is the geo location and update the event details accordingly. To do this, the host 110 may edit or modify the event by retrieving it from database 130 via server 125. The host 110 may recall the saved location and associated it with the event by entering the saved location in the appropriate text block of the event details block 200 (e.g., the "Venue Name" or "Geo Location" text blocks." Moreover, the saved location may be retrieved via an insert location button (not shown) in the event details block. The host 110 may browse through any saved locations saved locally on the host device 105, or in database 130. These saved locations may be selected and automatically entered into the "Venue Location" or "Geo Location" text block. Moreover, the current physical location of the host device 105 may be used to update the location of the event in real-time or near real-time. For example, if the event is a parade, the host 110 may be a band instructor of a band performing in the parade. The host device 105 may continuously update the focused event location of the event as the parade progresses. Thus, a user attending the parade via an invite by the band instructor may be updated of the band's location throughout the parade.

Additionally or alternatively, the host device 105 may be capable of determining the general and focused event locations from a map application (not shown) on the host device 105 or another device from which the information may be copied and inserted into the appropriate text blocks. For example, the host 110, via the host interface 115, may define the location of the event on a map, similar to the one shown in FIG. 6. The map application may be any type of map application such as Google Maps, Bing Maps, among others. The host 110 may click or tap on the location of the event on the map to receive an address or venue, or a specific geo location within the address or venue. Moreover, the host 110 may need permission or authorization from a third party to hold an event at a certain location. For example, the general event location may be a public park. In order to host a picnic at the park, the host 110 may need permission from the park supervisor in order to reserve a specific pavilion. The host, upon receiving confirmation of the reservation may then acquire the focused event location, e.g., geo location of the pavilion via any of a variety of methods including those discussed herein by way of example (e.g., using a map application or GPS application.)

The focused event location may also be a location separate from the general event location such as a parking structure, or meeting place. The focused event location may be a geo location supplied by the host 110 and used by the GPS system 160 to direct the user 145 to a parking lot or parking garage relating to the event. Thus, the geo location is used to provide more precise directions to the event than that of a street address. Thus, the user 145 is directed to a specific location and not a general location.

The create event block 200 may also include a save button 215 and an add invitees button 220. The save button 215 may save the event locally on the host device 105 as well as in database 130 at server 125. This allows the event to be retrieved and modified at a later time. The add invitees button 220 may allow the host 110 to add invitees to the event. The invitees may be listed by name, email address, phone number, and so on. Additionally or alternatively, the invitees may be selected from the host's address book including selecting individuals and groups. If a company wishes to host a picnic for all of its clients, it may select those clients from a "Clients" group. Similarly, if a commercial outfitter such as a retail establishment wishes to host a customer appreciation day, they may select to invite all users who are registered for their specific account in database 130, as described above. Social networking cites such as Facebook® and LinkedIn® may also facilitate event invites. A cancel button 225 may cancel the create event block 200 and return the user 145 to the previous screen or interface. Although not shown in FIG. 2, additional option blocks may be presented in create event block 200 to allow the host 110 to select whether the event is a private event or public event.

FIG. 3 illustrates an exemplary interface for searching for an event. A search block 300 may be presented in user interface 150 to facilitate performing a search of a plurality of events. The search block 300 may include search fields 305 with corresponding text blocks 310. The search fields 305 may include fields such as venue name, city, and state, zip code, street address, event name, event date and event time. To search existing events saved in database 130, the user 145 may fill in one or more of the text blocks 310 with corresponding text input. For example, if the user 145 wishes to search for a baseball game on August 31, the user 145 may enter "baseball" in the text block corresponding to the event name field, and "Aug. 31, 2011" in the text block corresponding to the date field. A search button 320 initiates a search of the events saved in database 130. Although not shown, Boolean operators such as "AND" and "OR" may also be used to search for an event. These operators may be included by creating a text string in the text block, such as "baseball AND game." A cancel button 325 is also presented in search block 300. The user 145 may select the cancel button 325 to return to close the search block 300 and return to the previous screen or interface.

FIG. 4 illustrates an exemplary interface for displaying event search results. Upon selecting the search button 320 after filling in at least one or more of the text blocks 310, a search result block 400 may be presented. Although shown separately, the search result block 400 may be displayed concurrently with the search event block 300. The search result block 400 may present the search results 405 in list form. The list may include columns including event fields 410. The event fields 410 may include fields such as event name, address, geo location, date and time. The event fields 410 may also include other aspects of the event such as the host name, number of attendees, etc. Further, the event fields 410 displayed in the search result block 400 may be customizable by the user 145. For example, the user 145 may choose to view only the event name and date fields by right clicking on the event fields 410 shown in the search result block 400. The number of results that the search produces may be displayed in the results block 415. The user 145 may edit the text in the text blocks 310 to change the search criteria. As the user 145 adds, deletes or changes the text, the search results block 400 may be updated in real-time or near real-time. Moreover, the results block 415 may dynamically change as the text blocks 310 are edited in the search event block 300. The view all button 420 may present the events in the event detail block 500, as described with respect to FIG. 5 below. Additionally or alternatively, the view on map button 425 may present the events on a map, as described with respect to FIG. 6 below.

Figure 5:
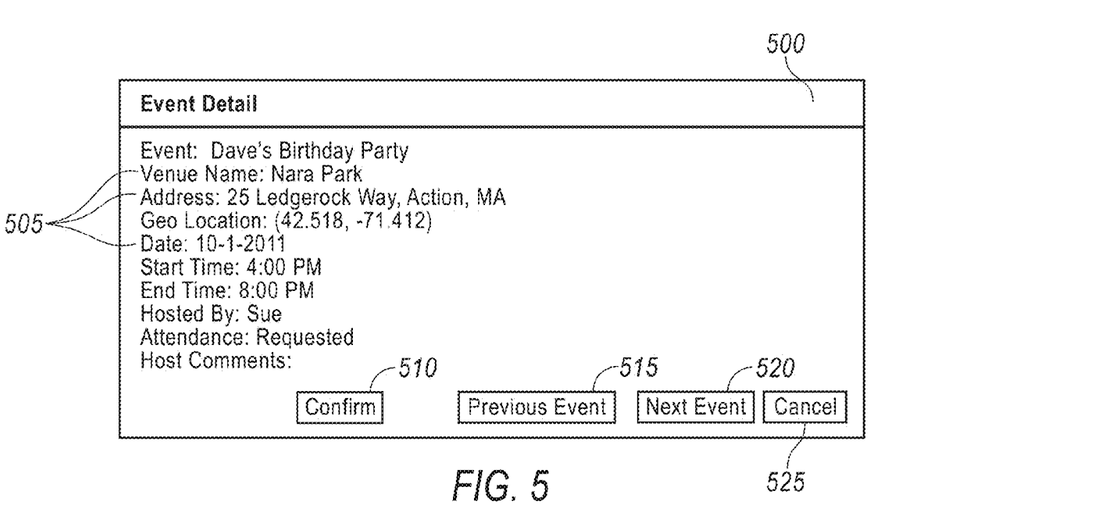
FIG. 5 illustrates an exemplary interface for displaying event details.

FIG. 5 illustrates an exemplary interface for displaying event details. An event detail block 500 may be presented upon selection of one or more of the events listed in the search result block 300. The event detail block 500 may be similar to the create event block illustrated in FIG. 2. For example, event fields 505 are presented setting forth the specific details relating to an event, such as, for example, the event name, venue name, geo location, date start time, end time, host name, attendance, comments, among others. The event details for a specific event may be presented in response to the user 145 selecting one of the listed events in the search result block 400. Additionally or alternatively, the user 145 may scroll through the results by selecting one of the previous event button 515 and the next event button 520. If and when the user 145 selects one or more events to attend, the user 145 may select the confirm button 510. In selecting the confirm button 515 a response is sent to the server 125 which updates the respective event in database 130. The user's calendar 155 on the user device 140 may also be updated to include the selected event. Once the user 145 is finished viewing available events, the user 145 may select the cancel button 525 to return to the previous screen or interface.

Figure 6:
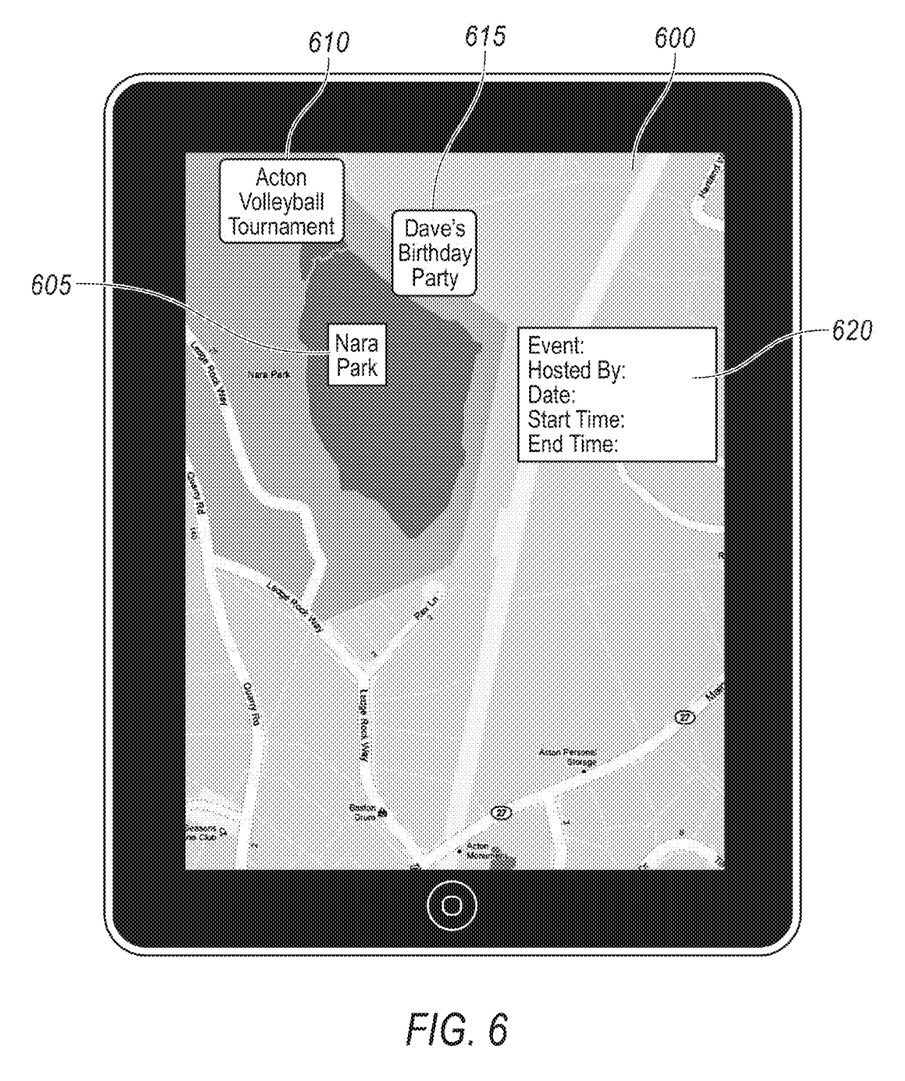
FIG. 6 illustrates an exemplary map result interface.
Figure 7:
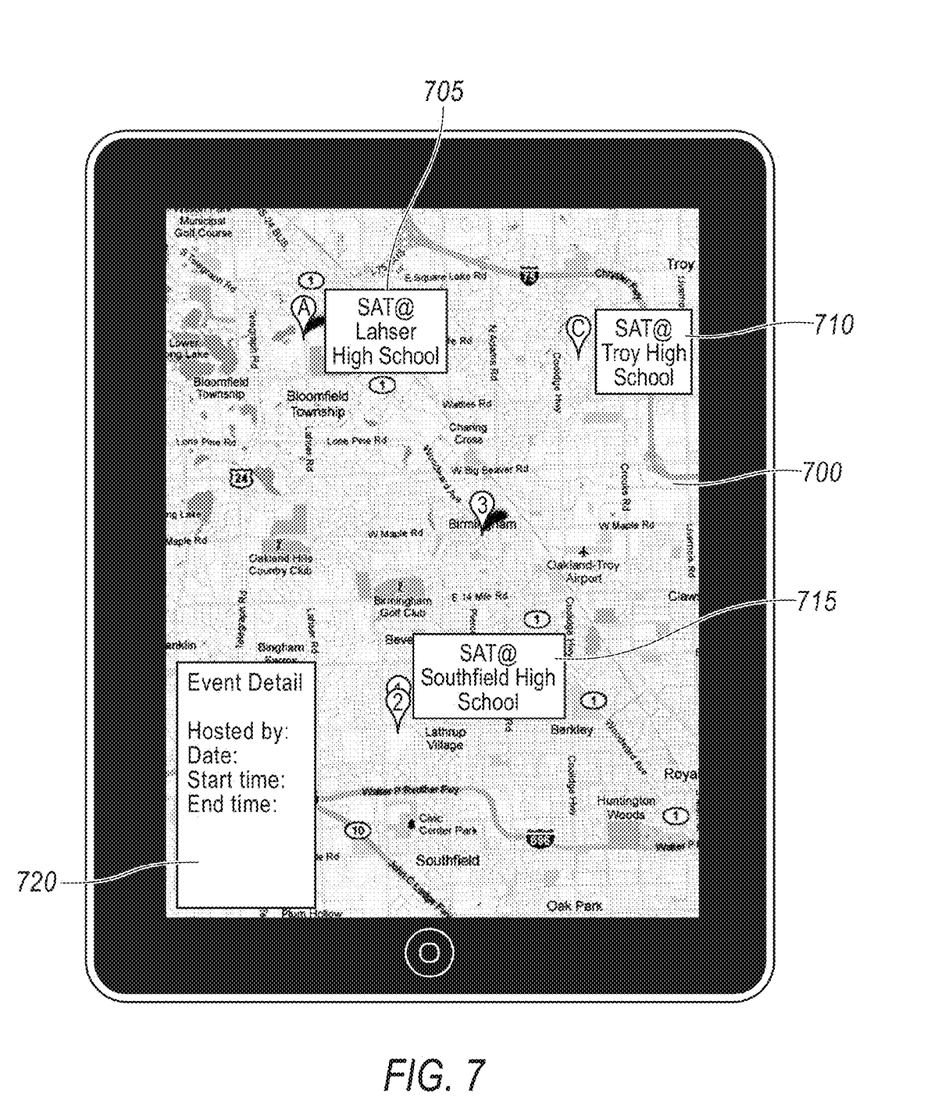
FIG. 7 illustrates another exemplary map result interface.

FIGS. 6 and 7 illustrate exemplary map result interfaces displaying the search results on a map in response to selecting the view on map button 425 in the search result block 400. FIG. 6 illustrates and exemplary map result interface 600 for displaying multiple events at a single venue 605, e.g., Nara Park. A general event 610 and focused event 615 may each be displayed by a text box on the map setting forth the event name, or other identifying information. Upon selecting the text box, an event detail block 620 may be displayed on the map. The event detail bock 620 may be similar to the event detail block 500 described above, which sets forth additional information about the event. Similarly, the event detail block 620 may include a confirm button (not shown) by which the user 145 may confirm his or her attendance of the event. The general event 610 and focused event 615, although at the same venue 605, or general event location, may be identified by a specific location, or focused event location, thus distinguishing their locations from one another. Moreover, the focused event 615, or "Dave's Birthday Party," may be considered a private event and only select users may be invited. Alternatively, the "Action Volleyball Tournament" may be a public event, by which any user 145 may attend.

FIG. 7 illustrates an exemplary map result interface 700 for displaying multiple locations of a single event, e.g., an SAT exam. Interface 700 may display a first venue 705, a second venue 710 and a third venue 715 on a map via text blocks. Additionally or alternatively, the venues may be displayed via push pins, or other markers indicating the location of the venue. The host 110 may be the test administrator responsible for organizing and administering the SAT exam. The host may create multiple events for each location of the event, or the host may create a single event having multiple locations. For example, the host 110 may enter several event locations via the create event block 200, such as Lahser High School, Troy High School and Southfield High School. Separate geo locations for each event location may be supplied by the host. This may be facilitated by entering multiple event venues and corresponding geo locations in the respective text blocks 210 of the create event block 200. In this case, the venues and geo locations may be separated by commas or semicolons to indicate that separate event locations exist. Additionally or alternatively, the create event block 200 may include multiple text blocks for each event field 205 so that multiple venues or geo locations may be entered for the same event, e.g., an SAT exam.

Upon selecting one of the text boxes, an event detail block 720 may be displayed on the map. The event detail block 720 may be similar to the event detail block 500 as described above. A user 145 may limit the map view to only a certain geographic area, such as a certain metro area. For example, in the text blocks 315 of the search event block 300, the user 145 may enter a certain city or state for which to view results for. Additionally or alternatively, the user 145 may zoom in and out in the map interface 700 to view the appropriate geographical area. By viewing the details of the event at multiple locations, the user 145 may determine which event to attend based on those details.

Figure 8:
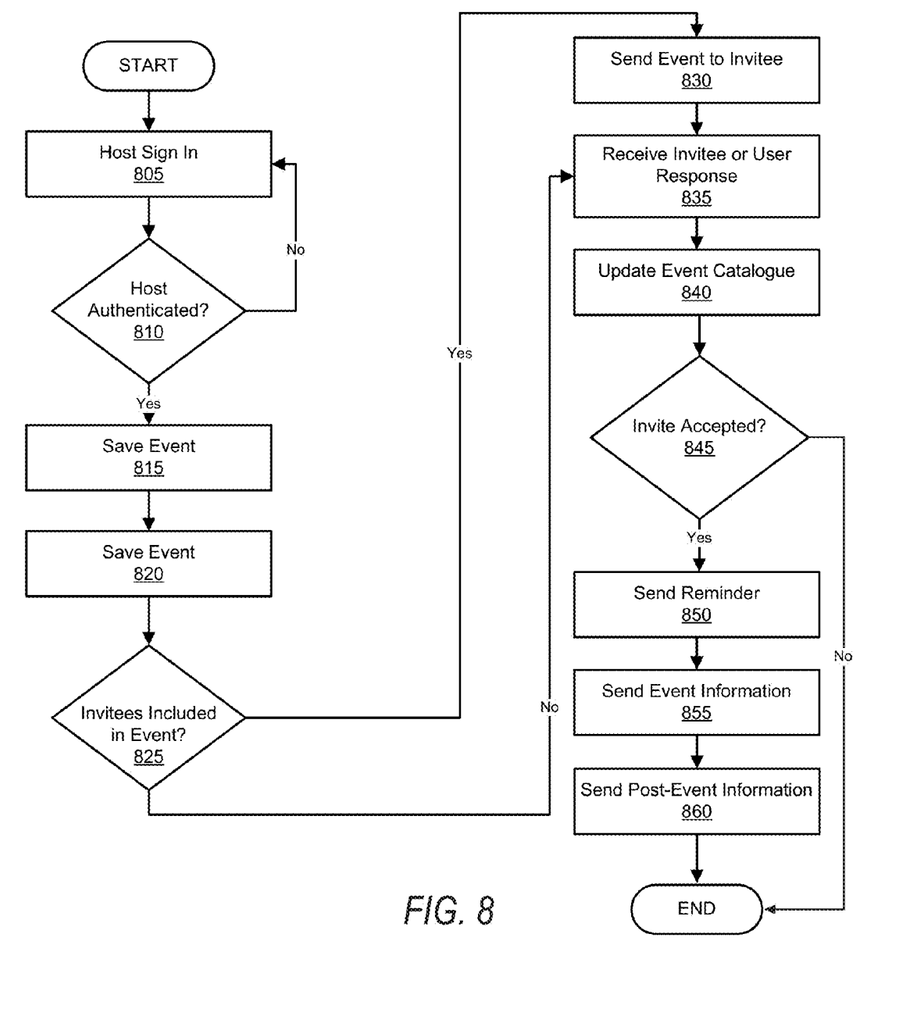
FIG. 8 illustrates a flow chart for establishing an event.

FIG. 8 illustrates and exemplary process flow for establishing an event.

In block 805, a host 110 may be authenticated before the host 110 may create or modify an event. For example, a host 110 may be prompted to input certain credentials via the host interface 115. The host 110 may sign in using a username and password, or use a biometric input such as a fingerprint. The server 125 may authenticate the information supplied by the host 110. Additionally or alternatively, a host 110 may be associated with a specific user device 105 and the user device 140 may automatically be recognized by the server 125. For example, the user device 140 may be authenticated based on its IP address or a PIN associated with the device.

In option block 810, it is determined whether the host 110 is authenticated. The server 125 may authenticate the host 110 by comparing the inputted host information with respective verification information saved in database 130. For example, the server 125 may look up the host's username in a table in database 130 and compare the inputted password with that saved in the table. If the host 110 is not authenticated, the process returns to block 805. If the host 110 is authenticated, the process proceeds to block 815.

In block 815, the host 110 may create an event. The host 110 may be prompted with the create event block 200 as described herein with respect to FIG. 2. The host 110 may establish the details of an event by filing in the respective text blocks 210. Additionally or alternatively, the host 110 may retrieve a previously saved event. Although not shown, the host 110 may select to open a saved event from the create event block 200. The host 110 may then change, add, or delete information within the retrieved event. The host 110 may also initiate the creation of an event by first viewing a map interface and selecting the location of the event. For example, in referring to FIG. 6, the host 110 may select a location at Nara Park for a birthday party. The location may be selected by double clicking or double tapping on an area of Nara Park, such as the north side of the lake. A popup window may be presented to allow the host 110 to create an event using an interface similar to that shown in FIG. 2. Once a host 110 enters a date for the event, other events taking place on that same date may be displayed on the map (e.g., "Acton Volleyball Tournament.") This may allow the host 110 to avoid any conflicts with other events. Private events may not be viewable or they may be viewable only with respect to certain information such as the location and time.

In block 820, after the user 145 has created the event, or made changes to an already existing event, the event may be saved in database 130 via server 125. The host 110 may be prompted to save the event under a certain name, or the event may be automatically saved under the event name listed in the "Event" field of the create event block 200.

In option block 825, it is determined whether the event identifies at least one invitee. As described above with respect to FIG. 2, the host 110 may identify invitees by several means, including name, email, phone number, etc. If the event includes at least one invitee, the process proceeds to block 830, if not, the process proceeds to block 835.

In block 830, the event is sent to the listed invitees via server 125. As described herein, the user 145 may access the event by logging into the event system and retrieving the event from the server 125.

In block 835, the server 125 may receive a response to the event invite from the user 145. For example, the user 145 may accept or decline the invite. Although not illustrated in the figures, the user 145 may also accept on a tentative basis or propose a new time or location via the user interface 150. Alternatively, the server 125 may also receive a response from a user 145 in the case of a public event. For example, a user 145 may search for an event and select to attend the event. In this example, server 125 receives a response from the user 145 that he or she will or will not attend the event, regardless of if the user 145 was an invitee. This is described in more detail with respect to FIG. 9.

In block 840, the event saved in database 130 may be updated via server 125 with the user's response to the invite. Database 130 may maintain a record of which users have responded. Database 130 may also maintain a count of how many users have accepted and declined the invite. The host 110 may receive periodic messages or emails from server 125 informing the host 110 of the attendance count as users accept or decline an event.

In option block 845, the server 125 determines whether the user 145 has accepted the event invite. If so, the process proceeds to block 850, if not, the process ends. Additionally or alternatively, as described herein, the calendar 155 may also provide an alert.

In block 850, the server 125 may send a reminder regarding the event to the user device 140. The reminder may be displayed on the user interface 150 of the user device 140. The reminder may also be a sound emitting from the device. The reminder may display the name of the event, as well as other information such as the location and time and may be sent anytime before the event begins.

In block 855, the server 125 may send additional event information to the user device 140. This information may be saved in database 130. This additional event information may include information about the event that was not included as part of the original invite. For example, the additional information may include the number of guests attending the event. The information may also include the focused event location. As explained above, the focused event location may be a geo location including longitudinal and latitudinal coordinates supplied to the GPS system of the user device 140. The geo location is a more specific location than that of the general street address of the location. Using the example given above, the general event location of an event may be the street address of the park. The focused event location, identified by the geo location, may a sub-location of the general event location such as the location of a birthday party in the park. Whereas the focused event location may be included in the initial event invite, it may additionally or alternatively be included in the additional information. This may be the case when the focused event location is not known when the original event invite is sent. Moreover, this information may change. For example, the focused event location may depend on the weather, the number of guests attending, etc. The information may also be sent just before the event commences to increase security of the event and prevent against attendance by un-invited guests. Thus, only the invited guests would receive the focused event location just prior to the starting time of an event.

The additional information may be sent along with the reminder, as explained with respect to block 850. The additional information and reminder may be sent at any time before the event commences. Additionally or alternatively, the additional information may be sent during and after the event as well. The additional information may provide updates to the user device 140 in the event that something about the event has changed. For example, due to inclement weather, an event may be moved indoors after it has already commenced at an outdoor location. Using the park example, "Dave's Birthday Party" may begin outside, but then be moved to a nearby pavilion when rain looks imminent. The guests, who may be enjoying the park, may be alerted, via their respective user devices 140, that the party is moving to a specific pavilion. If and when the host 110 decides to relocate the party due to the rain, the host 110 may update the event information via the host interface 115. For example, the host 110 may update the geo location to that of the specific pavilion. The host device 105 may send this update to the server 125 which in turn may log the update in the database 130. The server 125 may then send the updated geo location to the user devices 140 of the participants. Upon receiving this pushed update, each user may be provided directions to the correct pavilion. Users may also receive additional information after the event has ended. For example, the user devices 140 may receive photos of the event, or follow up information relating to the event.

In block 860, the host device 105 may receive post event information. This information may be sent by the server 125 after the event has ended and may include a summary of the event. The summary may include the number of participants, average arrival and departure times of the participants, and so on. This may help the host 110 learn who was in attendance, as well as aid in the planning of future events. In addition to the host 110 receiving this post event information from the server 125, the server 125 may also mark the event as 'complete' or 'inactive.' By doing this, the event may no longer show up as a search result, or be visible to other hosts or users.

Figure 9:
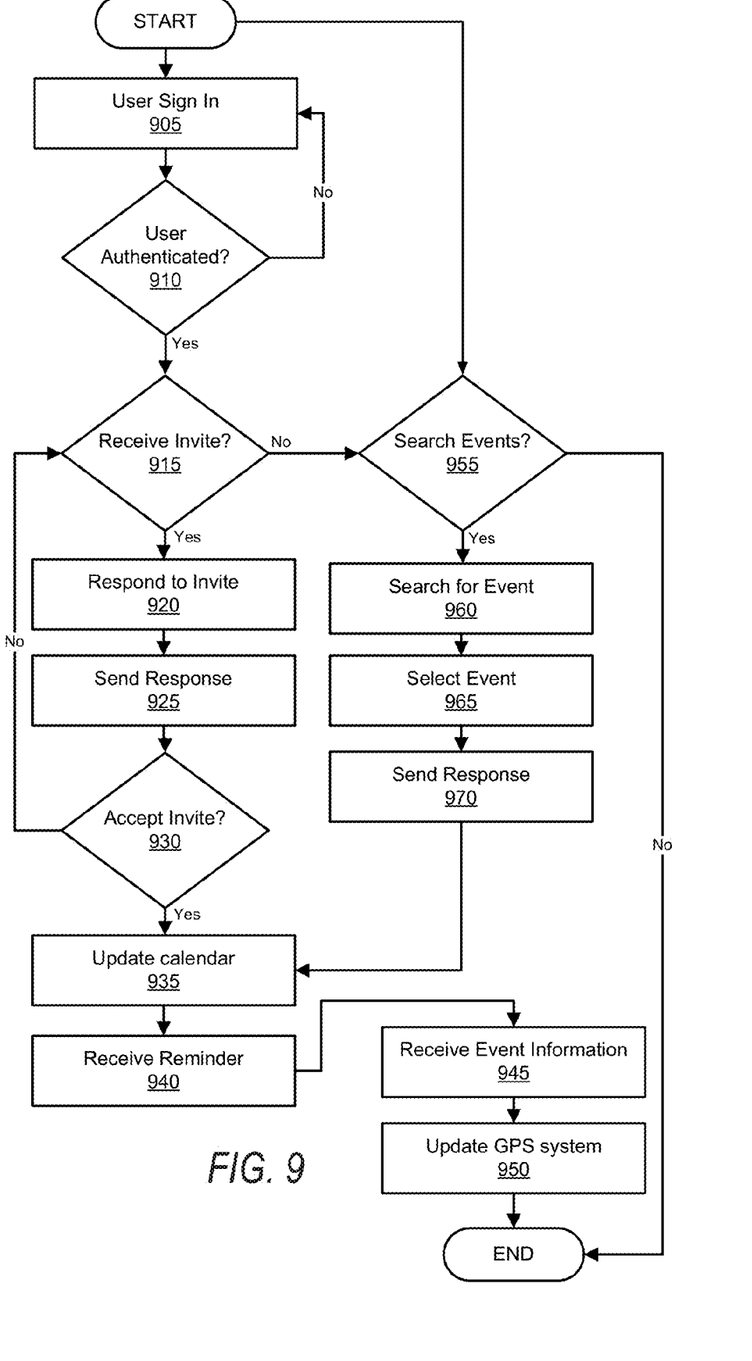
FIG. 9 illustrates a flow chart for searching and selecting an event.

FIG. 9 illustrates an exemplary process flow for searching and selecting events.

In block 905, a user 145 may be authenticated. As with the host sign in, the user 145 may sign in using a username and password. The server 125 may authenticate the sign in information supplied by the user 145. Additionally or alternatively, the user 145 may be associated with a specific user device 105 and the user device 140 may automatically be recognized by the server 125. For example, the user device 140 may be authenticated based on its IP address or a PIN associated with the device. In the case of a public event a user may, but not necessarily, still be required to be authenticated depending on the host 110 of the event. For example, if the event is a public event established via Facebook®, the user 145 may need to log in to his or her account in order to search and/or view the public event.

In option block 910, it is determined whether the user 145 is authenticated. The server 125 may authenticate the user 145 based on the user sign in information provided in block 905. If the user 145 is not authenticated, the process returns to block 905. If the user 145 is authenticated, the process proceeds to block 915. Additionally or alternatively, sign in and authentication may not be necessary and the process may proceed directly to block 915 or 955. Generally, but not necessarily, if the user 145 wishes to search a public event, authentication of the user may not be necessary.

In option block 915, it is determined whether the user 145 has received any event invites from the server 125. For example, the user 145 may be alerted, via the user interface, of certain pending invites. The interface 150 may display a list of private events that the user 145 has been invited to. By selecting one of the events, the user 145 may display the event details, such as those shown in FIG. 5. Additionally, the user may be prompted, via the user interface 150, to select to either view pending invites or to search for events. The searching of events is described with respect to option block 955. If the user has received at least one event invite and selects to view that invite, the process proceeds to block 920, if not, the process proceeds to block 955.

In block 920, the user 145 may respond to the event invite by either accepting or declining the invite. The user 145 may also accept the event on a tentative basis or propose a new time or location via the user interface.

In block 925, the response may be sent to server 125 which in turn may save the response in database 130. Database 130 may maintain a record of the responses received from the invited users 145.

In option block 930, the user device 140 may determine whether the user 145 has accepted the event invite. If so, the process proceeds to block 935, if not the process proceeds back to option block 915. If the process proceeds back to option block 915, the user 145 may view any remaining event invites that have not yet been viewed. Additionally or alternatively, the process may proceed to option block 955.

In block 935, a calendar located within the user device 140 may be updated to include the accepted event in response to the user 145 accepting the invite.

In block 940, the user device 140 may receive a reminder from the server 125 about the event via the user interface. Additionally or alternatively, the user device 140 may alert the user 145 of the event by providing a reminder internally via the calendar. Thus, both the server 125 and the calendar 155 may send an alert to remind the user 145 of the event. The reminder supplied in block 940 is to remind the user 145 that the event is approaching so that in the event that the user 145 forgot about the event, he or she may now plan accordingly.

In block 945, the user device 140 may receive additional information about the event. As explained above, this information may include information that was not part of the original invite, such as updated event information including the focused event location. Further, calendar 155 may be updated to include the updated event information in response to receiving the additional information. For example, a first updating of a calendar system (e.g., at block 935) may include the general event information and a second updating of the calendar system may include the focused event information supplied by the additional information.

In block 950, the GPS system of the user device 140 is update to include the focused event location. For example, the GPS system may provide driving directions to the event based on the geo location supplied by the additional information. The GPS system may then direct the user 145 to the event and provide very precise and specific instructions to the user 145 for arriving at the event based on the focused event location supplied by the server 125.

In option block 955, the user 145 may choose to search for existing events. If the user 145 selects to search for events, the process proceeds to block 960, if not, the process ends. Additionally, the user may be prompted via the user interface 150 to either view pending invites or to search for events. Option blocks 915 and 955 are only shown as an exemplary configuration and it is not necessary that the user 145 is only permitted to search for events in response to there being no pending invites.

In block 960, the user 145 may search for a public event. As explained, these public events may be any number of events for which an invite is not necessary, such as sporting events, expos, among others. As explained with respect to FIG. 3, the user 145 may insert any number of various search terms to search and view a portion of public events.

In block 965, the user 145 may select an event by reviewing the search results from block 960. For example, the user 145 may scroll through the events using buttons 515, 520 and accept an event using button 510.

In block 970, once the user 145 has selected an event, a response may be sent via the server 125 to database 130. The host 110 of the event may in turn retrieve this information and use it to establish an attendance count. The process then proceeds to block 935, which is described above.

Optionally, the user device 140 may send periodic updates to the server 125 of the location and status of the user. For example and as mentioned previously, the user device 140 may send a message to the server 125 alerting the server 125 that the user 145 has arrived at the event location. Similarly, the server 125 may be notified when the user 145 leaves the event location. This type of communication allows the server 125 to update the host 110 with the number of participants, available parking, etc.

Figure 10:
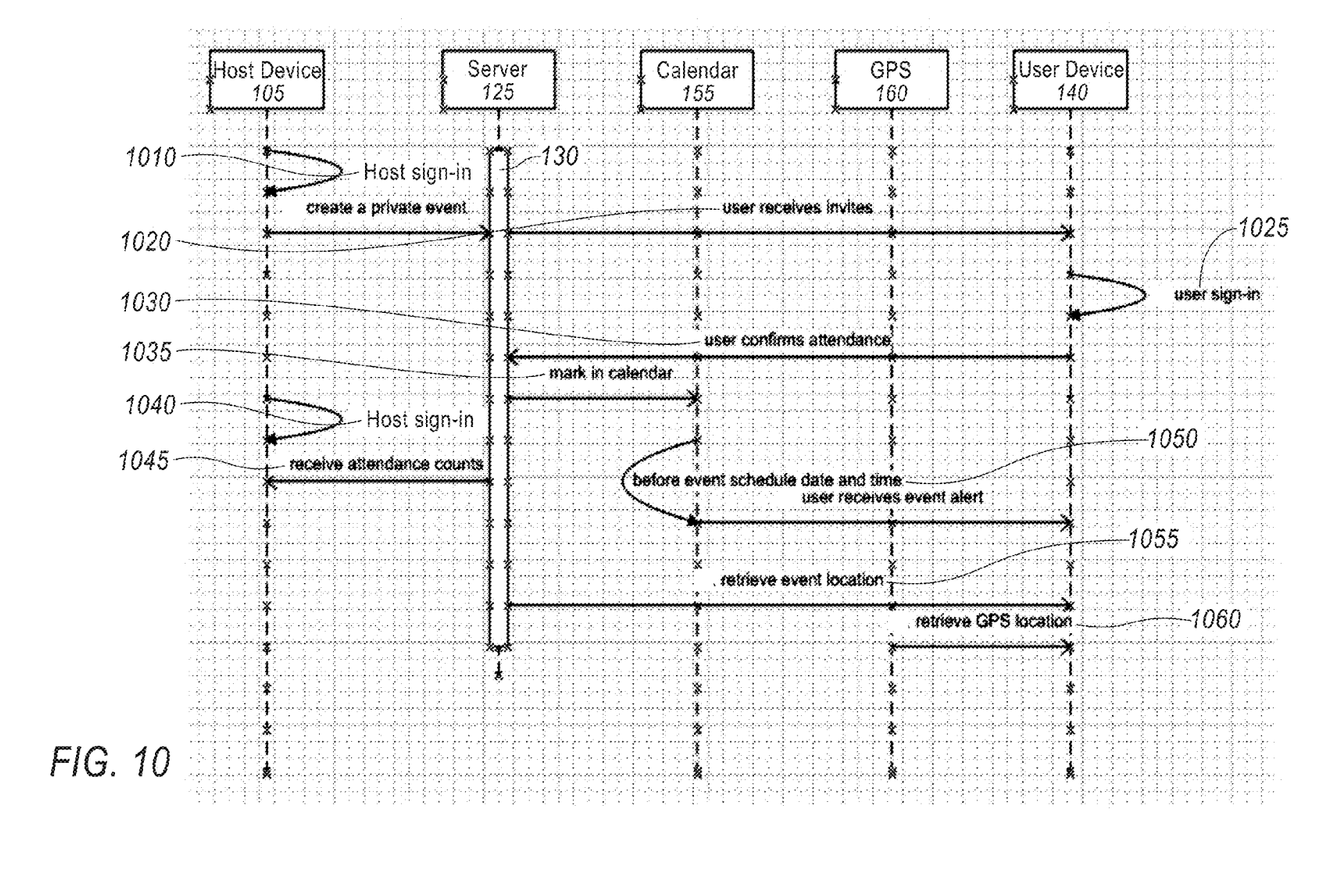
FIG. 10 illustrates an exemplary sequence diagram of the localized navigational system.

FIG. 10 is an exemplary sequence diagram of the navigational system 100 for implementing a private event. The sequence diagram sets forth a process that is similar to those described above with respect to FIGS. 8 and 9. For example, in step 1010, the host 110 may first be authenticated at host device 105. In step 1015, the host 110 may then create an event via the host interface 115 on host device 105. In step 1020, the event is then sent to the server 125, which forwards the event to any listed invitees. The user device 140 receives an event invite at the user device 140, the event including the general event location. In step 1025, the user 145 may be required to be authenticated in order to view the event invite. In step 1030, after the user 145 is authenticated, the user 145 may accept or decline the event. In this example, the user 145 has accepted the event invite and a response is sent to the server 125 and saved in database 130. In response to the user 145 accepting the event invite, at step 1035, the calendar 155 is updated to include this event. In step 1040, the host 110 may once again be prompted to sign in. Once the host is once again authentication, the host may receive additional information about the event, such as an attendance count at step 1045. This may be received from database 130 which catalogs each event as well as the responses received in response to the event invite. At step 1050, and before the event is to commence, the calendar 155 may provide an alert to the user 145 via the user interface 150 reminding the user 145 of the event. In step 1055, the user device 140 may then receive the focused event location from server 125, which in turn may update the GPS system in the user device 140. In step 1060, the user 145 may then be directed, via the GPS system, to the exact location of the event.

Figure 11:
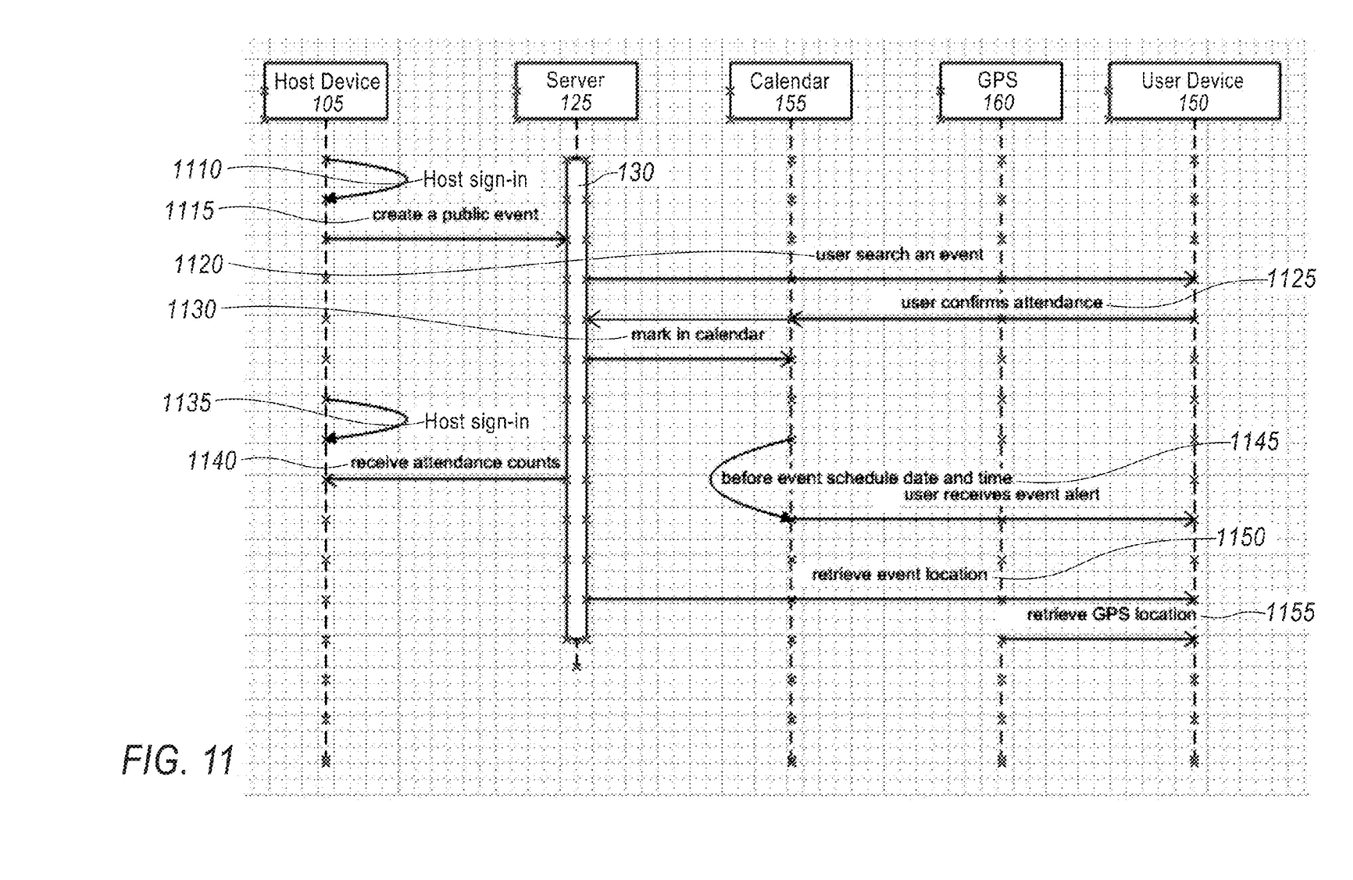
FIG. 11 illustrates another exemplary sequence diagram of the localized navigational system.

FIG. 11 is another exemplary sequence diagram of the navigational system 100 for implementing a public event. Similar to FIG. 10, in step 1110, the host 110 may first be authenticated at host device 105 and create an event via host interface 115. In step 1115, the event is then sent to the server 125 and saved in database 130. Unlike a private event, which may be exclusive to the specified invitees, a user 145 may actively search for an event to attend in step 1120. Additionally, users 145 may be invited to public events. For example, certain users 145 may be invited to attend a volleyball tournament because they have played in the tournament in the past. Concurrently, other users 145 may search for the volleyball tournament and select to attend. Under this example, when the user 145 finds an event saved in database 130 that he or she wished to attend, the user 145 may confirm attendance of that event in step 1125. This confirmation may be sent to the server 125 and cataloged in database 130. In step 1130, the calendar 155 may also be updated to include this event. In step 1135, the host 110 may once again be prompted to sign in to receive, in step 1140, additional information about the event, for example, an attendance count. This may be received from database 130 which catalogues each event as well as the responses that are received from the users 145. At step 1145, and before the event is to commence, the calendar 155 may provide an alert to the user 145 via the user interface 150 reminding the user 145 of the event. In step 1150, the user device 140 may then receive the focused event location from server 125, which in turn may update the GPS system in the user device 140. In step 1155, the user 145 may then be directed, via the GPS system, to the exact location of the event. In one example, the focused event location may be to a location associated with the event and the directions supplied to the user 145 by the user device 140 may not be to the event itself, but to the parking structure associated with the event. Because the server 125 is updating the event information in real-time or near real-time, the user 145 may receive updates via server 125 about the event, including parking information. For example, the user 145 may be updated about the availability of parking in a structure, or be directed to another parking structure if one is full. This may become known based at least in part on the attendance count maintained in database 130. For example, once a user 145 has parked, the user device 140 may update the database 130 via server 125 that the user 145 has arrived at the parking structure. The database 130 may update the attendance count.

The database 130 may also maintain how many parking spots are available as part of the event details supplied by the host 110. The sever 125 may compare the amount of available parking spots to the attendance count. If the attendance count meets or exceeds the amount of available parking spots, server 125 may send an alert to the users who have not yet arrived, directing them to a different parking structure. Moreover, the host 110 may be alerted to the parking status via server 125. In the same example, once a user 145 has parked, the user device 140 may then direct the user 145 to the exact location, or yet another focused event location. For example, in the birthday party example, the user 145 may be directed to the exact location in the park that the reunion is taking place. In the same example, if inclement whether arises, the user 145 may be directed to yet a fourth location, e.g., a pavilion, and so on.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
a server configured to:
sending first event information associated with an event to a user device, the first event information including a general event location of the event;
receive a user reply to the first event information;
maintain first event information including the general event location and second event information including a focused event location associated with the event, wherein the focused event location is not included in the first event information and is more specific than the general event location;
adjust the focused event location of the event after the general event location of the event has been sent to the user device;
select at least a portion of the second event information when the user reply indicates a selection to attend the event;
send at least the portion of the second event information to the user device in response to the user reply selecting to attend the event; and
update a calendar system on the user device to include the general event location in response to the user reply selecting to attend the event and further update the calendar system on the user device to include the focused event location;
wherein the focused event location is a geographical coordinate that includes at least one of latitude, longitude and elevation coordinate and that is received from a host device after the first event information has been sent to the user device; and
wherein the host device is configured to determine the geographical coordinate by being physically present at the geographical coordinate.

2. The system of claim 1, wherein the general event location is at least one of a street address and a venue, and the focused event location is a geographic coordinate separate from the general event location.

3. The system of claim 1, wherein the user device includes a system configured to automatically provide navigational directions in response to receiving the focused event location.

4. The system of claim 1, wherein the server is further configured to send the reply to the host device.

5. A method comprising:
sending first event information including a general event location associated with an event from a server to a user device;
receiving, at the server, a user reply to the first event information from the user device;
maintaining first event information including the general event location and second event information including a focused event location associated with the event, wherein the focused event location is not included in the first event information and is dynamically adjustable after the first event information has been sent to the user device;
selecting at least a portion of the second event information when the user reply indicates a selection to attend the event;
sending at least the portion of the second event information to the user device in response to the user reply selecting to attend the event; and
updating a calendar system on the user device to include the general event location in response to the user reply selecting to attend the event and a further updating of the calendar system on the user device to include the focused event location;
wherein the focused event location is a geographical coordinate that includes at least one of latitude, longitude and elevation coordinate and that is received from a host device after the first event information has been sent to the user device; and
wherein the host device is configured to determine the geographical coordinate by being physically present at the geographical coordinate.

6. The method of claim 5, further comprising creating the first event information associated with the event, the first event information identifying at least one invitee associated with the user device to be invited to the event.

7. The method of claim 5, further comprising transmitting at least one of the general event location and the focused event location in response to the user device performing an event search.

8. The method of claim 5, further comprising establishing the focused event location in response to the host device being physically present at the least one of a plurality of sub-locations within the general event location.

9. A non-transitory computer-readable medium tangibly embodying computer-executable instructions comprising:
receiving an event having event information including at least one general event location associated with the event;
saving the event and the event information in a respective event catalog of a database;
transmitting an event invite to at least one invitee device based on the event information;
receiving at least one response to the event invite from the at least one invitee device, wherein the invitee selects to attend the event;
updating the event catalog based on the response to include response information;
selecting a focused event location from a plurality of sub-locations within the general event location, wherein the selection is based on the response information maintained in the event catalog;
determining the general event location and the focused event location with a map application;
transmitting, in response to the invitee selecting to attend the event, additional information associated that includes the focused event location with the event to the at least one invitee device, where the additional information is dynamically adjustable after transmitting the event invite;
updating a calendar system on the invitee device to include the general event location in response to the invitee selecting to attend the event and a further updating of the calendar system on the invitee device to include the focused event location;
wherein the focused event location is a geographical coordinate that includes at least one of latitude, longitude and elevation coordinate and that is received from a host device after the event information has been sent to the invitee device; and
wherein the host device is configured to determine the geographical coordinate by being physically present at the geographical coordinate.

10. The computer-readable medium of claim 9, further comprising maintaining an index of the at least one response associated with the at least one invitee within the respective event catalog of the database, and further wherein the index is updated substantially in real time.

11. The computer-readable medium of claim 9, wherein the focused event location is selected based on the at least one response associated with the at least one invitee.

12. The computer-readable medium of claim 9, wherein the additional information includes a number of guests attending the event.

13. The system of claim 1, wherein the server is further configured to:
  maintain an event catalog that tracks each reply, and
  select at least the portion of the second event information based on the event catalog.

14. The system of claim 1, wherein at least the portion of the second event information is dynamically selected and sent to the user device based on at least one of an event starting time according, weather conditions, and a number of guests attending the event.

15. The system of claim 1, wherein the second event information includes parking information that is sent by the server to the user device based on the reply.

16. The system of claim 1, wherein the second event information includes at least one of a reminder of the event, an update associated with the event, and follow up information associated with the event that is sent by the server to the user device based on the reply.

* * * * *